(12) United States Patent
Mak

(10) Patent No.: US 7,051,552 B2
(45) Date of Patent: May 30, 2006

(54) CONFIGURATIONS AND METHODS FOR IMPROVED NGL RECOVERY

(75) Inventor: John Mak, Santa Ana, CA (US)

(73) Assignee: Floor Technologies Corporation, Aliso Viejo, CA (US)

( * ) Notice: Subject to any disclaimer, the term of this patent is extended or adjusted under 35 U.S.C. 154(b) by 36 days.

(21) Appl. No.: 10/478,349

(22) PCT Filed: Nov. 7, 2002

(86) PCT No.: PCT/US02/36068

§ 371 (c)(1),
(2), (4) Date: Jun. 14, 2004

(87) PCT Pub. No.: WO03/040633

PCT Pub. Date: May 15, 2003

(65) Prior Publication Data

US 2004/0237580 A1 Dec. 2, 2004

Related U.S. Application Data

(60) Provisional application No. 60/337,481, filed on Nov. 9, 2001.

(51) Int. Cl.
*F25J 3/00* (2006.01)
(52) U.S. Cl. .......................... 62/621; 62/625
(58) Field of Classification Search .......... 62/620, 62/621, 625, 632

See application file for complete search history.

(56) References Cited

U.S. PATENT DOCUMENTS

| | | | | |
|---|---|---|---|---|
| 4,203,741 A * | 5/1980 | Bellinger et al. | ............. | 62/621 |
| 4,430,103 A * | 2/1984 | Gray et al. | ................... | 62/620 |
| 4,511,381 A * | 4/1985 | Mehra | ........................ | 62/625 |
| 4,578,094 A * | 3/1986 | Mehra | ........................ | 62/635 |
| 4,696,688 A * | 9/1987 | Mehra | ........................ | 62/625 |
| 4,743,282 A * | 5/1988 | Mehra | ........................ | 62/625 |
| 4,854,955 A * | 8/1989 | Campbell et al. | ............. | 62/621 |
| 6,182,469 B1* | 2/2001 | Campbell et al. | ............. | 62/621 |
| 6,244,070 B1* | 6/2001 | Lee et al. | ..................... | 62/620 |
| 6,526,777 B1* | 3/2003 | Campbell et al. | ............. | 62/621 |
| 2001/0052241 A1* | 12/2001 | Jain et al. | ...................... | 62/621 |
| 2003/0005722 A1* | 1/2003 | Wilkinson et al. | ............ | 62/613 |
| 2003/0029190 A1* | 2/2003 | Trebble | ........................ | 62/620 |

* cited by examiner

Primary Examiner—William C. Doerrler
(74) Attorney, Agent, or Firm—Rutan & Tucker, LLP

(57) ABSTRACT

Feed gas (1) in an improved NGL processing plant is cooled below ambient temperature and above hydrate point of the feed gas to condense heavy components (6) and a significant portion of water (4) contained in the feed gas. The water (4) is removed in a feed gas separator (101) and the condensed liquids are fed into an integrated refluxed stripper (104) that operates as a drier/demethanizer for the condensed liquids, and the uncondensed portion (5) containing light components is further dried (106) and cooled prior to turboexpansion (23) and demethanization (112). Consequently, processing of heavy components in the cold section is eliminated, and feed gas with a wide range of compositions can be efficiently processed for high NGL recovery at substantially the same operating conditions and optimum expander efficiency.

20 Claims, 4 Drawing Sheets

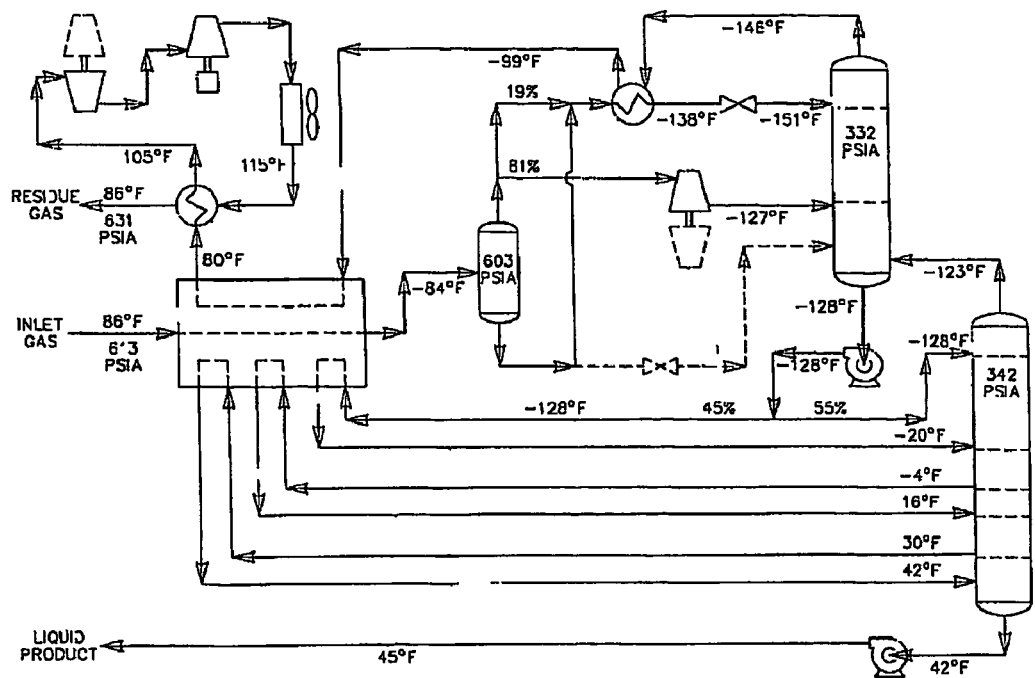
Prior Art Figure 1
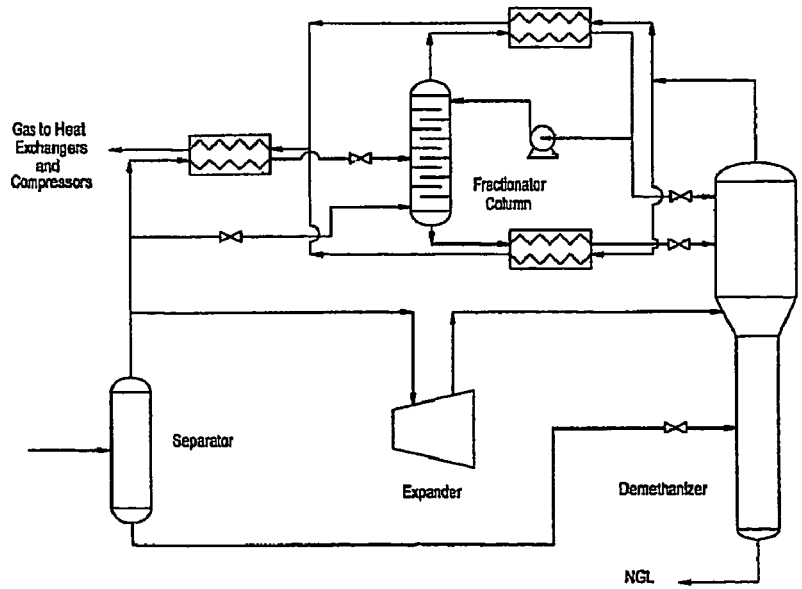
Prior Art Figure 2

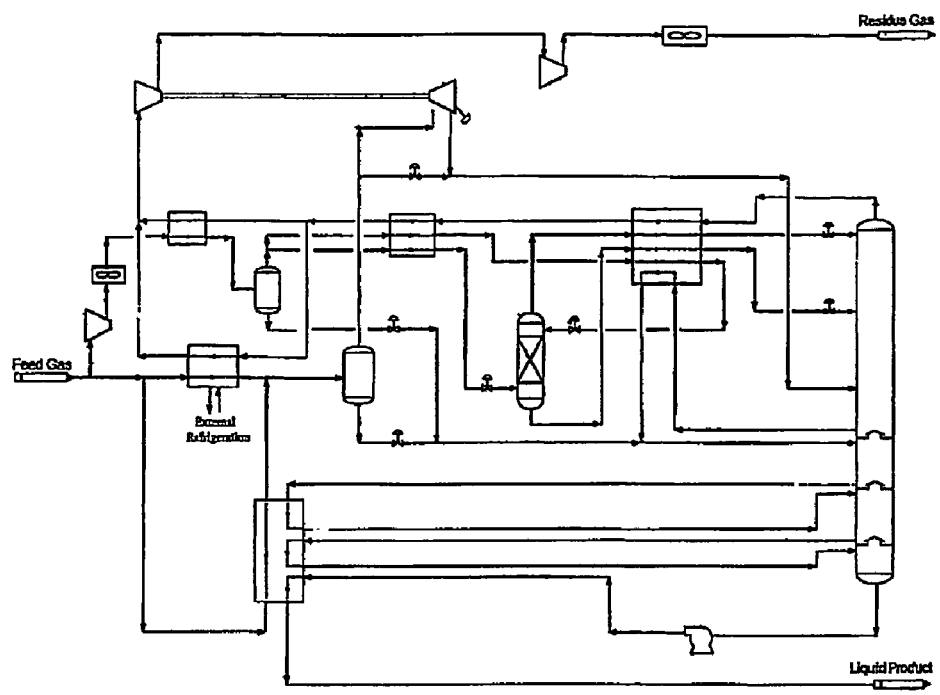
Prior Art Figure 3
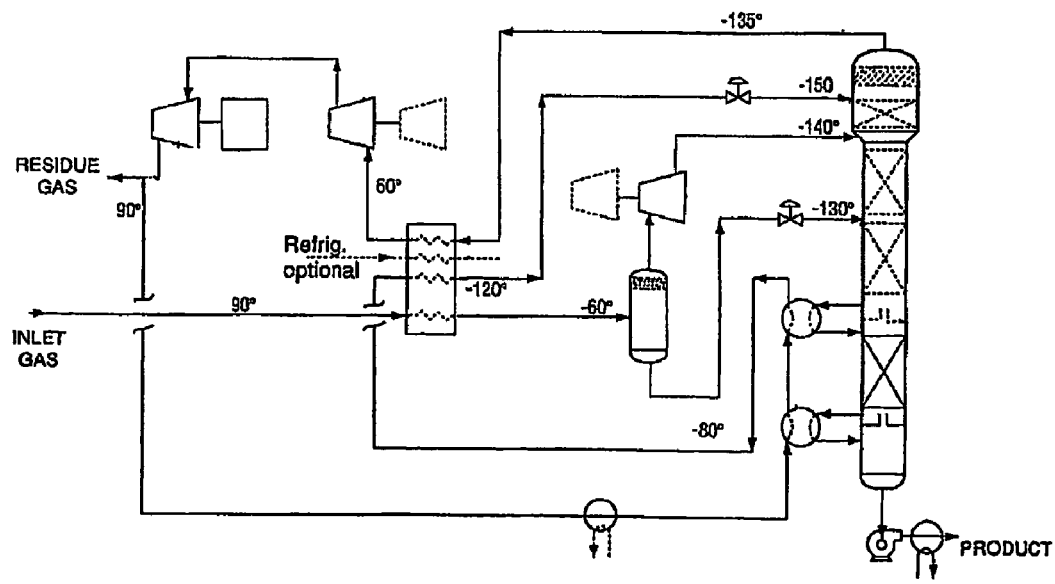
Prior Art Figure 4

Heat And Material Balance - C2+ Recovery

|  | Total Feed Gas | Fuel Gas | Mixed NGL | Residue Gas |
|---|---|---|---|---|
| Component Flow, lbmol/hr |  |  |  |  |
| Nitrogen | 295 | 11 | 0 | 285 |
| CO2 | 130 | 3 | 68 | 59 |
| H2S | - | - | - | - |
| Methane | 31,045 | 1,103 | 41 | 29,901 |
| Ethane | 2,246 | 11 | 1,969 | 266 |
| Propane | 1,127 | 2 | 1,087 | 38 |
| I-Butane | 272 | 0 | 268 | 4 |
| n-Butane | 455 | 0 | 449 | 5 |
| I-Pentane | 190 | 0 | 190 | 1 |
| n-Pentane | 194 | 0 | 194 | 1 |
| C6+ | 505 | 0 | 505 | 0 |
|  | - |  |  |  |
| Pressure, psia | 1,102 | 65 | 350 | 986 |
| Temperature, °F | 110 | 110 | 110 | 120 |
| Molar Flow, lbmol/hr | 36,458 | 1,129 | 4,769 | 30,560 |
| Mass Flow, lb/hr | 756,239 | 18,519 | 237,100 | 500,620 |
| Liquid Flow, BPD |  |  | 31,502 | 112,449 |
| Gas Flow, MMscfd | 332 | 10 |  |  |

NGL Recovery:

C2 Recovery 87.7%
C3 Recovery 96.5%

Figure 6

CONFIGURATIONS AND METHODS FOR IMPROVED NGL RECOVERY

This application claims the benefit of U.S. provisional patent application with the Ser. No. 60/337,481, which was filed Nov. 9, 2001 and which is incorporated by reference herein.

FIELD OF THE INVENTION

The field of the invention is recovery from natural gas liquids (NGL) from feed gases.

BACKGROUND OF THE INVENTION

Recovery of NGL from various feed gases has become more and more economically attractive, and there are numerous process configurations and methods known in the art to increase NGL recovery from a feed gas. Typical examples include cryogenic expansion configurations and processes described in U.S. Pat. No. 4,157,904 to Campbell et al., U.S. Pat. No. 4,251,249 to Gulsby, U.S. Pat. No. 4,617,039 to Buck, U.S. Pat. No. 4,690,702 to Paradowski et al., U.S. Pat. N Campbell et al., U.S. Pat. No. 5,799,507 to Wilkinson et al., and U.S. Pat. No. 5,890,378 to Rambo et al.

However, while all of these processes exhibit relatively high NGL recovery, several difficulties still remain. Among other things, NGL recovery processes employing cryogenic expansion typically require the use of a turboexpander to provide the cooling of the feed gas for high propane or ethane recovery. Moreover, many known NGL recovery processes are designed to process a specific gas composition at specific inlet conditions. Consequently, when the feed gas composition changes, NGL recovery will typically be reduced and potential product revenue lost. In order to maintain a high NGL recovery, costly revamp of equipment of the existing unit is often required. In addition, dehydration costs are often relatively high in such configurations as the entire feed gas needs to be dried (e.g., with the use of molecular sieves) to avoid freezing out of water in the cryogenic section. Consequently, various optimizations have been developed. For example, Campbell et al. describe in U.S. Pat. No. 6,182,469 that dried feed gas is cooled in a heat exchanger using cold residue gas and side reboilers as depicted in Prior Art FIG. 1. The condensed liquids are then separated in a separator and fed to the demethanizer. Alternatively, as described by Sorensen in U.S. Pat. No. 5,953,935, an absorber may be added upstream of a demethanizer as depicted in Prior Art FIG. 2. In such configurations, the liquids from the feed separator and the absorber bottoms are fed to the demethanizer. To enhance NGL recovery, the absorber overhead is cooled and refluxed by chilling with the demethanizer overhead vapor.

In still further known configurations, as described in U.S. Pat. No. 6,244,070 to Lee et al. and U.S. Pat. No. 5,890,377 to Foglietta, the reboiler duties are integrated in feed chilling, and in these configurations, liquids from the intermediate separators are fed to various positions in the downstream demethanizer for NGL recovery. These processes also include various means of providing cooling to the NGL processes. Exemplary configurations according to Elliott and Foglietta are depicted in Prior Art FIGS. 3 and 4, respectively.

Such optimized configurations typically increase the NGL recovery to at least extent. However, significant process limitations nevertheless remain. Most significantly, as the liquids separated from the intermediate cooling steps are fed to the demethanizer, such configurations generally operate at best efficiency for a relatively specific and narrow range of feed gas compositions. Consequently, when the feed gas composition varies, in particular, when the feed gas contains more $C_{5(+)}$ components, NGL recovery will be significantly reduced and energy consumption will be increased (Typically due to the additional $C_{5(+)}$ component increasing the operating temperature of the NGL recovery unit, thereby resulting in a less efficient operation of the turboexpander and the demethanizer).

Therefore, although various configurations and methods are known to recover NGL from a feed gas, all or almost all of them suffer from one or more disadvantages. Therefore, there is still a need to provide methods and configurations for improved NGL recovery.

SUMMARY OF THE INVENTION

The present invention is directed to NGL recovery plants and configurations, in which the feed gas is cooled to remove at least some of the water and $C_{5(+)}$ liquid from the feed gas, thereby maintaining a relatively lean gas to the downstream unit. Contemplated plants include an intermediate separator that separates an at least partially dehydrated gas in to a $C_{5(+)}$ depleted gas and a $C_{3(+)}$ liquid. Contemplated plants further include a turboexpander receiving at least part of the $C_{5(+)}$ depleted gas, and a refluxed stripper receiving a $C_{5(+)}$ liquid from a feed separator and further receiving the $C_{3(+)}$ liquid from the intermediate separator as a reflux.

Especially preferred configurations further include a gas drier that receives and dries a gas from the feed separator thereby generating the at least partially dehydrated gas, and the at least partially dehydrated gas is further cooled by at least one of a first heat exchanger and a second heat exchanger (wherein cooling in the first heat exchanger is provided by a reboiler circuit from a demethanizer, and wherein cooling in the second heat exchanger is provided by an overhead product of the demethanizer). Furthermore, it is contemplated that another part of the $C_{5(+)}$ depleted gas may be cooled by a third heat exchanger (wherein cooling in the third heat exchanger is provided by the overhead product of the demethanizer) to be employed as a reflux for the demethanizer.

In still further contemplated configurations, the refluxed stripper includes a dehydration section (most preferably a triethylene glycol (TEG) dehydration section comprising a vapor-TEG contacting device). With respect to the feed separator, it is contemplated that the feed separator receives a feed gas that is cooled to a temperature above the gas hydration point, and that the feed separator further separates at least a portion of water contained in the feed gas from the feed gas. The feed gas in particularly preferred configurations will comprise ethane, propane, and heavier components, wherein recovery of the ethane and propane from the feed gas is at least 87% and 97%, respectively.

In another aspect of the inventive subject matter, contemplated plants will include a demethanizer that receives a $C_{5(+)}$ depleted gas (e.g., provided by an intermediate separator), wherein a first portion of the $C_{5(+)}$ depleted gas is expanded in a turboexpander, and wherein a second portion of the $C_{5(+)}$ depleted gas is cooled, and used as a demethanizer reflux. In such configurations, it is contemplated that a feed separator separates a feed gas into a $C_{5(+)}$ depleted gas portion and a liquid portion, wherein the $C_{5(+)}$ depleted gas portion is cooled and separated in the intermediate separator, thereby producing the $C_{5(+)}$ depleted gas.

In a further aspect of the inventive subject matter, a plant comprises a refluxed stripper that receives a water saturated $C_{5(+)}$ liquid and further comprises a mid-tower dehydration stage, wherein the refluxed stripper is operated as a demethanizer, and wherein the refluxed stripper receives a reflux from an intermediate separator that provides a $C_{5(+)}$ depleted gas to a demethanizer.

Various objects, features, aspects and advantages of the present invention will become more apparent from the following detailed description of preferred embodiments of the invention, along with the accompanying drawings.

BRIEF DESCRIPTION OF THE DRAWINGS

Prior Art FIG. 1 is a schematic of one known configuration for NGL recovery in which dried feed gas is cooled in a heat exchanger using cold residue gas and side reboilers.

Prior Art FIG. 2 is a schematic of another known configuration for NGL recovery in which an absorber is positioned upstream of a demethanizer.

Prior Art FIG. 3 is a schematic of yet another known configuration for NGL recovery in which reboiler and feed gas compression are integrated in feed chilling.

Prior Art FIG. 4 is a schematic of a still further known configuration for NGL recovery in which reboiler and compressed residue gas recycle are integrated in feed chilling.

FIG. 6 is a table listing calculated compositions of gas streams in an exemplary NGL recovery plant according to the inventive subject matter.

DETAILED DESCRIPTION

Figure 5:
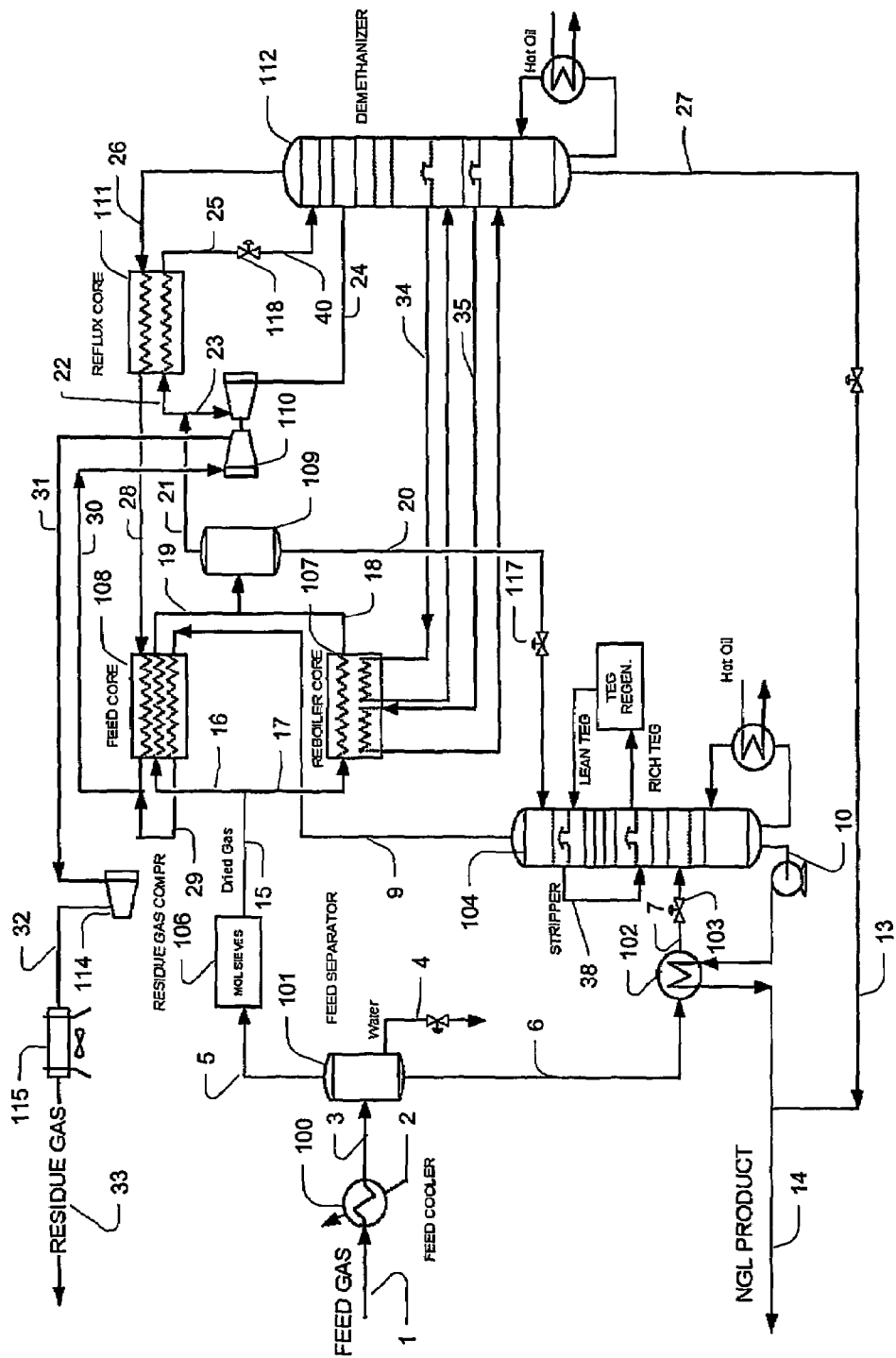
FIG. 5 is a schematic of an exemplary configuration for NGL recovery according to the inventive subject matter.

The inventor has discovered that efficient NGL recovery can be achieved in a plant that processes a wide range of feed gas compositions, and that contemplated configurations are especially efficient (i.e., relatively high recovery at low energy consumption) when the feed gas is relatively rich in $C_2$ and $C_{3(+)}$ components. Moreover, particularly contemplated configurations will significantly reduce dehydration energy and will further eliminate processing of heavy components in the feed gas in the cold section of the plant.

A particularly preferred configuration is depicted in FIG. 5, in which wet feed gas 1 having a typical composition as shown in the table of FIG. 6 is cooled by feed gas cooler 100 at high pressure (e.g., about 800 psig to about 1400 psig) by a refrigerant 2 to just above the hydrate formation point (typically about 55° F. to about 65° F.). A downstream feed separator 101 (preferably a three phase separator) removes water 4 from the cooled feed gas 3, thus reducing the size and energy consumption of the downstream dehydration unit and cryogenic equipment. The feed separator 101 further separates the cooled feed gas 3 into a liquid portion 6 and a vapor portion 5. The liquid portion 6 is preheated in exchanger 102 to stream 7, and is let down in pressure via JT valve 103 and fed to the refluxed stripper 104. The stripper bottoms product 10 comprises the NGL product containing mostly $C_{5(+)}$ components, which is employed to preheat the feed liquid 6 in exchanger 102.

With respect to the configuration of the refluxed stripper, it should be appreciated that the stripper is an integrated vessel having a lower stripping section, a mid section dehydration section, and an upper absorption section. The mid section comprises dehydration trays using an appropriate drying medium (e.g., triethylene glycol (TEG)) to produce a dried gas (e.g., about −40° F. water dew point). Drying using a dehydration section is particularly advantageous because the liquid from the feed separator 101 is generally saturated with water and may potentially freeze in the upper section if not removed. The upper absorption section operates typically at about −5° F. to −35° F. and is refluxed with a $C_{5(+)}$ rich cold liquid 20 from the intermediate separator 109.

In the upper section of the refluxed stripper, the reflux stream 20, being a colder liquid, will condense and absorb most of the $C_{3(+)}$ components from the dried vapor from the mid section. The $C_{3(+)}$ enriched liquids are collected in a chimney tray in the upper section and routed to the lower stripping section bypassing the TEG section. The stream is shown as stream 38 in FIG. 5.

Operating pressure of the contemplated strippers is typically in the range of about 300 to 450 psig, and contemplated operating temperatures will typically be in the range of about −5° F. to −35° F. at the upper section, and 250° F. to 350° F. in the lower section. The stripper overhead gas 9 is predominantly residue gas with a methane content of about 50 to 70 mol %. The refrigeration content of the overhead gas 9 may be used to provide cooling to the feed vapor 16 in the residue gas heat exchanger 108.

The vapor stream 5 from the feed separator 101 is dried in a dryer unit 106 (preferably using molecular sieves) to produce stream 15 which is further split into two streams 16 and 17. Stream 16 is chilled in a residue gas heat exchanger 108 with the demethanizer overhead stream 28, and the stripper overhead vapor 9 to about −10° F. to 10° F. Stream 17 is chilled in a reboiler heat exchanger 107 with the demethanizer side-draw streams 34 and 35 to about −10° F. to 10° F. The so dried and chilled vapor portions are then fed into an intermediate separator 109 (typically an expander suction drum).

A $C_{5(+)}$ enriched liquid 20 is separated in the intermediate separator 109 from the dried and chilled vapor portion 18 and 19, let down in pressure via JT valve 117 and fed to the top of the refluxed stripper 104 as a cold reflux. It should be especially recognized that in all previously known processes, the intermediate separator liquids are invariably fed to a downstream column such as the demethanizer. In contrast, contemplated configurations will feed the intermediate separator liquids to an upstream column, the refluxed stripper, which is particularly valuable when a high NGL recovery is desired. The $C_{5(+)}$ enriched liquid 20 from the intermediate separator is most suitable to be used to recover the $C_{3(+)}$ components from the feed separator liquid 6, producing a very lean stripper overhead gas 9 that is depleted in $C_{3(+)}$ components.

A $C_{5(+)}$ depleted vapor 21 is separated in the intermediate separator 109 from the dried and chilled vapor streams 18 and 19. Stream 21 is split into two portions, stream 22 and stream 23. Stream 23, at about 40% to 60% of stream 21, is expanded in turbo expander 110 to stream 24 prior to entering the demethanizer 112, while stream 22 is further chilled by a reflux heat exchanger 111 (using demethanizer overhead vapor 26 as the refrigerant) to stream 25 and let down in pressure in a JT valve 118 to provide a demethanizer reflux stream 40. The refrigerant content of the demethanizer overhead from the reflux exchanger 111 may further be utilized in a second heat exchanger (e.g., residue gas heat exchanger 108 upstream of the intermediate separator 109), while the demethanizer bottoms product 27 comprises the desired NGL product (which may be let down in pressure via a JT valve to stream 13 prior to combination with stripper bottoms product 10 to form NGL product stream 14).

The heated residue gas vapor 28 from exchanger 108 is combined with the stripper overhead vapor stream 29 to form stream 30 and fed to the compressor driven by the turbo expander 110 that compresses the gas to stream 31. Stream 31 is further compressed by the residue gas compressor 114 to stream 32 which is further cooled by air cooler 115 prior to being delivered to the sales gas pipeline as stream 33.

The term "$C_{5(+)}$ enriched" liquid, vapor, or other fraction as used herein means that the liquid, vapor, or other fraction has a higher molar fraction of $C_5$, $C_5$ isoforms, and/or heavier components than the liquid, vapor, or other fraction from which the $C_{5(+)}$ enriched liquid, vapor, or other fraction is derived. Similarly, the term "$C_{5(+)}$ depleted" liquid, vapor, or other fraction as used herein means that the liquid, vapor, or other fraction has a lower molar fraction of $C_5$, $C_5$ isoforms, and/or heavier components than the liquid, vapor, or other fraction from which the $C_{5(+)}$ depleted liquid, vapor, or other fraction is derived.

With respect to the fed gas it is generally contemplated that suitable feed gases include ethane and propane, and may further comprise carbon dioxide. Consequently, it should be appreciated that the nature of the feed gas may vary considerably, and all feed gases in plants are considered suitable feed gases so long as they comprise $C_2$ and $C_3$ components, and more typically $C_1$–$C_5$ components, and most typically $C_1$–$C_{6(+)}$ components. Therefore, particularly preferred feed gases include natural gas, refinery gas, and synthetic gas streams obtained from other hydrocarbon materials such as coal, crude oil, naphtha, oil shale, tar sands, and lignite. Suitable gases may also contain relatively lesser amounts of heavier hydrocarbons such as propane, butanes, pentanes and the like, as well as hydrogen, nitrogen, carbon dioxide and other gases.

Depending on the particular source and nature of the feed gas, it should be recognized that the cooling of the feed gas may vary considerably. However, it is generally preferred that the feed gas is cooled to a temperature that is above (typically about 5° F. and more typically about 10° F.) the hydrate point of the feed gas. Therefore, where the feed gas is natural gas, exemplary cooled feed gas temperature will be in the range of about 55° F. to about 65° F. Similarly, depending on the particular feed gas, the pressure of the feed gas may vary substantially. However, it is generally preferred that the feed gas has a pressure between about 800 psig to about 1400 psig, and more typically between about 1000 psig to about 1400 psig.

There are numerous suitable feed separators known in the art, and it is generally contemplated that all such feed separators are appropriate. However, particularly preferred feed separators include three-phase separators in which water can be separated from the hydrocarbonaceous liquid and vapor phases. It is further contemplated that the demethanizer, heat exchanger, dryer, residue gas compressor, and turboexpander used in the present configurations are conventional devices well known to the skilled artisan. The intermediate separator is most preferably an expander suction drum. However, alternative intermediate separators will include all separators that separate condensed $C_{5(+)}$ enriched liquids from $C_{5(+)}$ depleted vapors.

Among other advantages of contemplated configurations, it should be particularly recognized that the intermediate separator produces a $C_{5(+)}$ enriched liquid and a $C_{5(+)}$ depleted vapor from a previously dried vapor portion of a feed gas. Thus, so produced $C_{5(+)}$ enriched liquids may advantageously be employed as a reflux to a stripper operating as a demethanizer to significantly improve NGL recovery. Moreover, since the vapor portion that is fed into the turbo expander is a $C_{5(+)}$ depleted vapor, operation of the turbo expander and downstream demethanizer will be substantially independent from fluctuations in the composition of the feed gas.

Still further, it should be recognized that by using a feed cooler and feed separator, and further cooling of the vapors from the feed cooler and separation of the cooled vapors in the intermediate separator (to form a $C_{5(+)}$ enriched liquid and a $C_{5(+)}$ depleted vapor) most, if not all of the heavier components are removed from the feed gas. Consequently, the composition of the material flowing through the cold section is substantially stabilized as processing of heavy components in the feed gas in the cold section of the NGL plant can be eliminated. Therefore, the heat duties, the turbo expander, and the demethanizer will operate at the most efficient points regardless of changes in the feed gas composition. Thus, contemplated configurations and processes allow simple and flexible handling of varying feed gas flow rates and gas compositions, thereby reducing the complexity of operating a turbo-expander under varying gas compositions in conventional designs. Viewed from another perspective, contemplated processes maintain constant operating conditions for the NGL recovery plant by removal of the heavy components in the feed gas. According to previously performed calculations (data not shown), contemplated configurations will achieve at least 80%, and more typically 87% ethane recovery, and at least 95%, and more typically 97% propane recovery (see FIG. 6).

Still further, the energy consumption for feed gas dehydration is significantly lowered as a substantial portion (typically between about 60% and about 95%, more typically between about 75% and about 90%) of the water content of the feed gas is removed in the feed separator.

Therefore, the inventors contemplate a plant comprising (1) a feed cooler that cools a feed gas comprising water and $C_{5(+)}$ components, and a feed separator that removes at least some of the water and $C_{5(+)}$ components from the cooled feed gas, (2) an intermediate separator fluidly coupled to the feed separator and separating an at least partially dehydrated gas in to a $C_{5(+)}$ depleted gas and a $C_{3(+)}$ liquid, (3) a turboexpander receiving at least part of the $C_{5(+)}$ depleted gas, and (4) a refluxed stripper (with absorption, dehydration and stripping sections integrated in a single column) receiving a $C_{5(+)}$ liquid from a feed separator and further receiving the $C_{3(+)}$ liquid from the intermediate separator as a reflux. In especially preferred configurations, a gas drier receives and dries a gas from the feed separator thereby generating the at least partially dehydrated gas, and the at least partially dehydrated gas is further cooled by at least one of a first heat exchanger and a second heat exchanger, wherein cooling in the first heat exchanger is provided by a reboiler circuit from a demethanizer, and wherein cooling in the second heat exchanger is provided by an overhead product of the demethanizer. Another part of the part of the $C_{5(+)}$ depleted gas may be cooled by a third heat exchanger, wherein cooling in the third heat exchanger is provided by the overhead product of the demethanizer, and wherein the cooled another part of the part of the $C_{5(+)}$ depleted gas is used as a reflux for the demethanizer.

In another aspect of contemplated configurations, a plant may include a demethanizer that receives a $C_{5(+)}$ depleted gas, wherein a first portion of the $C_{5(+)}$ depleted gas is expanded in a turboexpander, and wherein a second portion of the $C_{5(+)}$ depleted gas is provided by an intermediate separator, cooled, and used as a demethanizer reflux, wherein a feed separator separates a feed gas into a $C_{5(+)}$ depleted gas portion and a liquid portion, and wherein the $C_{5(+)}$ depleted gas portion is cooled and separated in the intermediate separator, thereby producing the $C_{5(+)}$ depleted gas.

In such configurations, it is generally preferred that a gas drier (most preferably using molecular sieves) dries the $C_{5(+)}$ depleted gas portion prior to cooling, and that the $C_{5(+)}$ depleted gas portion is cooled by at least one of a first heat exchanger and a second heat exchanger, wherein cooling in the first heat exchanger is provided by a reboiler circuit from the demethanizer, and wherein cooling in the second heat exchanger is provided by an overhead product of the demethanizer. Cooling of the second portion of the $C_{5(+)}$ depleted gas may be provided by a third heat exchanger, and wherein cooling in the third heat exchanger is provided by the overhead product of the demethanizer.

In still another aspect of contemplated configurations, a plant comprises a refluxed stripper that receives a water saturated $C_{5(+)}$ liquid and further comprises an upper absorption section, a mid-tower dehydration section and a lower stripping section, wherein the stripper is operated as a demethanizer, and wherein the stripper receives a reflux from an intermediate separator that provides a $C_{5(+)}$ depleted gas to a demethanizer. In such configurations, it is preferred that the intermediate separator receives an at least partially dehydrated gas that is separated from a feed gas in a feed gas separator, and wherein the feed gas separator further produces the water saturated $C_{5(+)}$ liquid.

Thus, specific embodiments and applications of configurations and methods for improved NGL recovery have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A plant comprising:
   a feed cooler cooling a feed gas comprising water and $C_{5(+)}$ components, and a feed separator that removes at least some of the water and $C_{5(+)}$ components from the cooled feed gas;
   an intermediate separator fluidly coupled to the feed separator separating an at least partially dehydrated gas in to a $C_{5(+)}$ depleted gas and a $C_{3(+)}$ liquid;
   a turboexpander receiving at least part of the $C_{5(+)}$ depleted gas; and
   a refluxed stripper comprising an absorption section, a dehydration section, and a stripping section, and receiving a $C_{5(+)}$ liquid from the feed separator and further receiving the $C_{3(+)}$ liquid from the intermediate separator as a reflux.

2. The plant of claim 1 further comprising a gas drier that receives and dries a gas from the feed separator thereby generating the at least partially dehydrated gas.

3. The plant of claim 2 wherein the at least partially dehydrated gas is further cooled by at least one of a first heat exchanger and a second heat exchanger, wherein cooling in the first heat exchanger is provided by a reboiler circuit from a demethanizer, and wherein cooling in the second heat exchanger is provided by an overhead product of the demethanizer and an overhead product gas from the stripper.

4. The plant of claim 2 wherein another part of the part of the $C_{5(+)}$ depleted gas is cooled by a third heat exchanger, wherein cooling in the third heat exchanger is provided by the overhead product of the demethanizer, and wherein the cooled another part of the part of the $C_{5(+)}$ depleted gas is used as a reflux for the demethanizer.

5. The plant of claim 1 wherein the feed separator is a three-phase separator.

6. The plant of claim 1 wherein the dehydration section comprises a triethylene glycol (TEG) dehydration section comprising a vapor-TEG contacting device.

7. The plant of claim 1 wherein the feed cooler cools the feed gas that to a temperature above a hydration point.

8. The plant of claim 7 wherein the feed gas is natural gas.

9. The plant of claim 7 wherein the feed gas comprises ethane, propane, and heavier components, and wherein recovery of the ethane and propane from the feed gas is at least 87% and 97%, respectively.

10. A plant comprising:
    a demethanizer receiving a $C_{5(+)}$ depleted gas from an intermediate separator, wherein a first portion of the $C_{5(+)}$ depleted gas is expanded in a turboexpander, and wherein a second portion of the $C_{5(+)}$ depleted gas is cooled and used as a demethanizer reflux;
    wherein a feed separator separates a feed gas into the $C_{5(+)}$ depleted gas and a liquid portion;
    wherein at least one of a first heat exchanger and a second heat exchanger are configured to cool the $C_{5(+)}$ depleted gas, and wherein the intermediate separator is configured to produce the first and second portions of the $C_{5(+)}$ depleted gas from the cooled $C_{5(+)}$ depleted gas; and
    a gas drier that dries the $C_{5(+)}$ depleted gas prior to cooling.

11. The plant of claim 10 wherein cooling in the first heat exchanger is provided by a reboiler circuit from the demethanizer, and wherein cooling in the second heat exchanger is provided by an overhead product of the demethanizer and an overhead product gas from the stripper.

12. The plant of claim 10 wherein cooling of the second portion of the $C_{5(+)}$ depleted gas is provided by a third heat exchanger, and wherein cooling in the third heat exchanger is provided by an overhead product of the demethanizer.

13. The plant of claim 10 further comprising a stripper that receives the liquid portion from the feed separator, and wherein the stripper further receives a $C_{3(+)}$ liquid from the intermediate separator as a reflux.

14. The plant of claim 13 wherein the stripper further includes a dehydration section.

15. The plant of claim 14 wherein the dehydration section comprises a triethylene glycol (TEG) dehydration section comprising a vapor-TEG contacting device.

16. The plant of claim 10 wherein the feed separator receives a feed gas that is cooled to a temperature above a hydration point.

17. The plant of claim 16 wherein the feed separator further separates at least a portion of water contained in the feed gas from the feed gas.

18. A plant comprising a stripper that receives a water saturated $C_{5(+)}$ liquid and further comprises a mid-tower dehydration stage, wherein the stripper is operated as a separate demethanizer, and wherein the stripper receives a reflux from an intermediate separator that provides a $C_{5(+)}$ depleted gas to a demethanizer.

19. The plant of claim 18 wherein the intermediate separator receives an at least partially dehydrated gas that is separated from a feed gas in a feed gas separator.

20. The plant of claim 18 wherein the feed gas separator further produces the water saturated $C_{5(+)}$ liquid.

* * * * *

UNITED STATES PATENT AND TRADEMARK OFFICE
CERTIFICATE OF CORRECTION

PATENT NO. : 7,051,552 B2 Page 1 of 1
APPLICATION NO. : 10/478349
DATED : May 30, 2006
INVENTOR(S) : John Mak It is certified that error appears in the above-identified patent and that said Letters Patent is hereby corrected as shown below:

On title page, item 73 Assignee
replace "Floor Corporation"
with --Fluor Corporation--.

Signed and Sealed this

Fifteenth Day of August, 2006

JON W. DUDAS
*Director of the United States Patent and Trademark Office*